(12) United States Patent
Keefer et al.

(10) Patent No.: US 6,273,123 B1
(45) Date of Patent: Aug. 14, 2001

(54) DRAW AND RETURN TUBE ASSEMBLY

(76) Inventors: Neal L. Keefer, 4025 NE. Couch St., Portland, OR (US) 97232; Kenneth A. Watson, 1100 NE. 126th St., Vancouver, WA (US) 98685

( * ) Notice: Subject to any disclaimer, the term of this patent is extended or adjusted under 35 U.S.C. 154(b) by 0 days.

(21) Appl. No.: 09/419,222

(22) Filed: Oct. 15, 1999

(51) Int. Cl.$^7$ .................................................. F02B 55/02
(52) U.S. Cl. .................... 137/351; 137/590; 137/592; 123/469
(58) Field of Search ................................. 137/588, 590, 137/592, 351, 343; 123/468, 469, 509, 514

(56) References Cited

U.S. PATENT DOCUMENTS

| | | | |
|---|---|---|---|
| 2,125,674 | * 8/1938 | Gould | 137/590 |
| 2,870,786 | * 1/1959 | Schroeder | 137/590 |
| 3,500,858 | * 3/1970 | Metcalf | 137/590 |
| 4,763,633 | * 8/1988 | Nakanishi | 123/514 |
| 5,056,489 | * 10/1991 | Lorraine | 123/468 |
| 5,056,492 | * 10/1991 | Banse | 123/509 |
| 5,201,298 | * 4/1993 | Shearn | 123/514 |
| 5,533,486 | 7/1996 | Qutub . | |
| 5,601,066 | 2/1997 | Qutub . | |
| 6,102,011 | * 8/2000 | Meyer et al. | 123/509 |
| 6,161,562 | * 12/2000 | Keefer et al. | 137/15.08 |

\* cited by examiner

*Primary Examiner*—John Rivell
(74) *Attorney, Agent, or Firm*—Ingrid McTaggart (57) ABSTRACT

A draw and return tube fuel assembly having a draw tube and a return tube welded to a flange. The tubes may be extruded in a variety of diameter sizes such that the assembly can be manufactured to connect to any size draw and return fuel line connectors. The method of manufacturing the draw and return tube assembly with extruded tubing eliminates the steps of heating, flaring and cleaning and thereby eliminates the corresponding hazardous materials created as a byproduct of these eliminated steps.

13 Claims, 7 Drawing Sheets

DRAW AND RETURN TUBE ASSEMBLY

TECHNICAL FIELD

The present invention relates to a fuel draw and return tube assembly for use in commercial vehicles, and more particularly, to an improved draw and return tube assembly for use in commercial vehicles with aluminum fuel tanks wherein the tubes are extruded in any desired diameter and then welded to a flange plate without requiring the prior art steps of heat treating, flaring and cleaning of the tubes.

BACKGROUND OF THE INVENTION

The present invention is particularly intended for use on commercial vehicles, although it may be used on any internal combustion engine connected to multiple fuel tanks. In particular, diesel engines typically operate by drawing fuel from a fuel tank, combusting a portion of the fuel and then returning the unused, or uncombusted, fuel to the fuel tank. Depending on engine loading conditions, a substantial volume of fuel drawn from the tank is unused by the engine and returned to the fuel tank. Accordingly, such draw and return assemblies play a vital role in the operation of diesel engines.

Heavy duty commercial vehicles, such as long haul tractor trailers, typically include dual fuel tanks, also called saddle tanks, wherein fuel is drawn simultaneously from both tanks for combustion within the engine. To prevent uneven fuel tank levels, which may lead to air being drawn into the engine, a means of balancing return fuel flow, such as draw and bottom return tube assemblies, typically are installed in each of the dual fuel tanks. One prior art draw and return tube assembly comprises draw and return tubes connected to a flange at one end and connected by a bracket at another end opposite the flange. The flange typically is mounted on an upper inside surface of the fuel tank such that the other, bracketed end of the tubes extends downwardly into the fuel held within the lower portion of the tank. Draw and return lines are connected to the flange, and thereby connected to the draw and return tubes. The draw and return line connectors typically are manufactured in unique predetermined diameters, often times differing from one truck maker to the next, and often times very different from the diameters of available, off-the-shelf drawn tubing. Identical draw and return tube assemblies are typically positioned in each of the two saddle tanks and are each connected to corresponding draw and return lines extending to the truck engine.

The tube openings opposite the flange typically extend away from one another and are each positioned an equal distance from the flange so that the draw and return tube fuel openings are also each positioned an equal distance below the top surface of fuel held within the tank. In this arrangement, when the two tanks and the corresponding draw and return tube assemblies are each positioned at a similar horizontal level on the commercial vehicle, the pressure head of fuel positioned above the draw and return tube openings of each assembly will result in equal amounts of fuel being withdrawn from each of the tanks and equal amounts of fuel being returned to each of the tanks. In addition, swedging or crimping of the end of the return tube opening opposite the flange will facilitate complete filling of the return tube. Accordingly, the draw and return tube assemblies of the prior art act as passive flow regulators for ensuring equal levels of fuel drawn and returned to each of the two saddle fuel tanks.

The process for manufacturing these prior art draw and return tube assemblies is quite time consuming and can be very expensive. The prior art process of manufacturing the assembly typically involves purchasing the drawn tubing in a predetermined size. Drawn tubing, such as aluminum drawn tubing, is relatively expensive to manufacture and is cost prohibitively expensive to manufacture in custom sizes. Moreover, small manufacturing operations often times cannot afford to draw their own tubing so that these manufacturers are required to purchase standard sized off-the-shelf drawn tubing. Accordingly, the draw and return tube assemblies of the prior art are manufactured with drawn tubing in one of a few predetermined sizes, regardless of the size tubing desired or required for the particular draw and return tube assembly.

The drawn tube is first cut to a particular length and conveyed under a gas flame or through a heating oven to anneal one end of the tube. This annealing step softens the tube and renders it more ductile thereby facilitating flaring of the tube. The annealed end of the tube is then flared to a size corresponding to the desired inner diameter for threading to a standard pipe thread which will match the corresponding draw or return line connector from the engine. In some cases, a drawn tube having an outer diameter of approximately 0.75 inch (in) (1.88 centimeters (cm)), must be flared as much as 0.2 in (0.5 cm), to an outer diameter of approximately 0.94 in (2.35 cm) in order to fit the corresponding connection to the draw or return line.

Flaring of the drawn tubing takes place in a flaring machine with hydraulic oil used as a lubricant. Prior to welding the flared tube to the flange, the hydraulic oil must be completely cleaned from the tube. This cleaning step produces environmental waste in the form of used hydraulic oil and detergents which must be disposed of in accordance with environmental regulations. Accordingly, this cleaning step can be quite costly.

After cleaning, the tube is then positioned on a bending machine. One end of the tube is then bent to the desired specifications. The other end of the tube, which has been flared, may also be bent and is positioned adjacent the flange and welded thereto. After welding, the inside surface of the flared end that has been welded to the flange is tapped to create threads. A bracket is then placed near the ends of the tubes opposite the flange to stabilize the assembly. The draw and return tube assembly is then ready for installation into a fuel tank and for connection to the connectors of the draw and return fuel lines.

The entire process of cutting, heating, flaring, cleaning, bending, positioning, welding, and then tapping takes approximately 4½ minutes for each tube, and approximately 9 minutes for each draw and return tube assembly. The steps of heating, flaring and cleaning take approximately one third of the allotted time frame. Accordingly, eliminating the heating, flaring and cleaning steps from the process will reduce the processing time by one third. Eliminating these steps will also reduce the processing costs. Moreover, eliminating the cleaning step will eliminate waste products that currently are placed in hazardous material disposal landfills. There is a need, therefore, for a draw and return tube assembly that can be manufactured without creating hazardous waste products, and which can be manufactured in a variety of connector sizes for use with a variety of draw and return tube lines of different commercial vehicle manufacturers.

SUMMARY OF THE INVENTION

The present invention provides an improved draw and return tube assembly, and process for manufacturing the same, that overcome the disadvantages of the prior art. One aspect of the present invention provides a draw and return tube assembly that can be manufactured in virtually any diameter such that the assembly can be manufactured to connect to any size draw and return line connectors. Another aspect of the present invention provides a method for manufacturing a draw and return tube assembly that uses extruded tubing in the desired diameter thereby eliminating the heating, flaring and cleaning steps of the prior art processes. Moreover, this improved process eliminates the hazardous materials created as a byproduct of the prior art processes and reduces the time required for completion of the process.

These features are provided generally in a draw and return tube assembly having a custom diameter extruded draw tube, a custom diameter extruded return tube, and a flange to which both tubes are welded. The inventive process comprises the steps of cutting, bending, welding and tapping of the tubes. Accordingly, the assembly and method of manufacturing the assembly provides a simple, low cost method for manufacturing a draw and return tube assembly in any desired diameter, without creating a hazardous byproduct which must be disposed of in a hazardous waste site.

DETAILED DESCRIPTION OF THE PREFERRED EMBODIMENT

As has been mentioned, the invention provides a draw and return tube assembly that is intended for use on commercial vehicles, although it may be used with any internal combustion engine connected to a fuel tank requiring a draw and return tube assembly.

Figure 1:
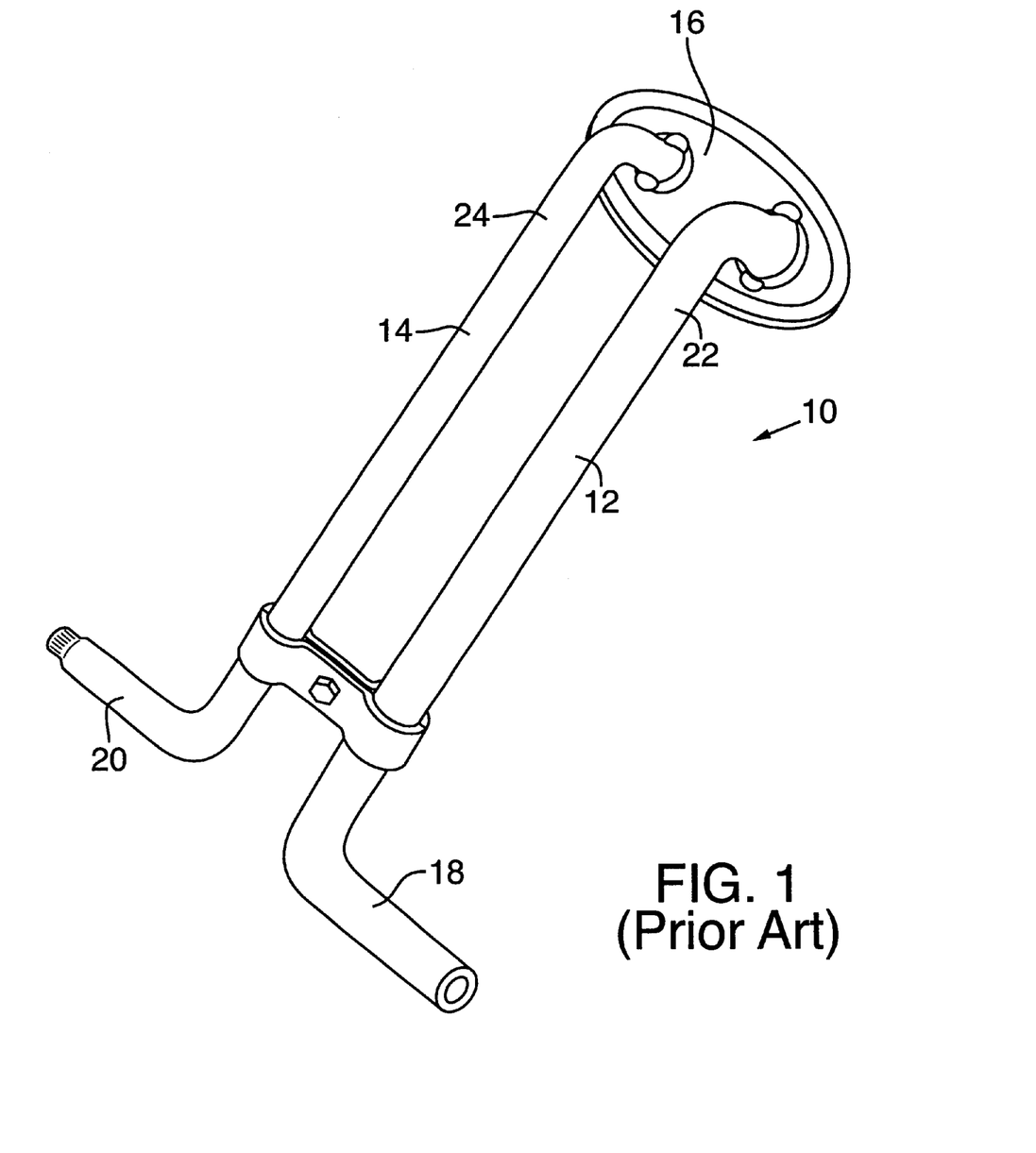
FIG. 1 is an isometric view of a draw and return tube assembly of the prior art.

FIG. 1 shows a draw and return tube assembly 10 of the prior art including a draw tube 12, a return tube 14, and a flange 16 to which the tubes are welded. Each of the tubes has a first end 18 and 20, respectively, positioned opposite the flange and a second end 22 and 24, respectively, welded to the flange. Ends 22 and 24 have each been flared such that the diameter of tubing welded to the flange is greater than the diameter of the remainder of the tube. The amount of flaring may depend on the size of drawn tubing initially used and the size of the draw and return fuel line connectors used to connect the draw and return tube assembly to the engine of the commercial vehicle. In some cases the tubes may be flared by as much as 30%.

Figure 2:
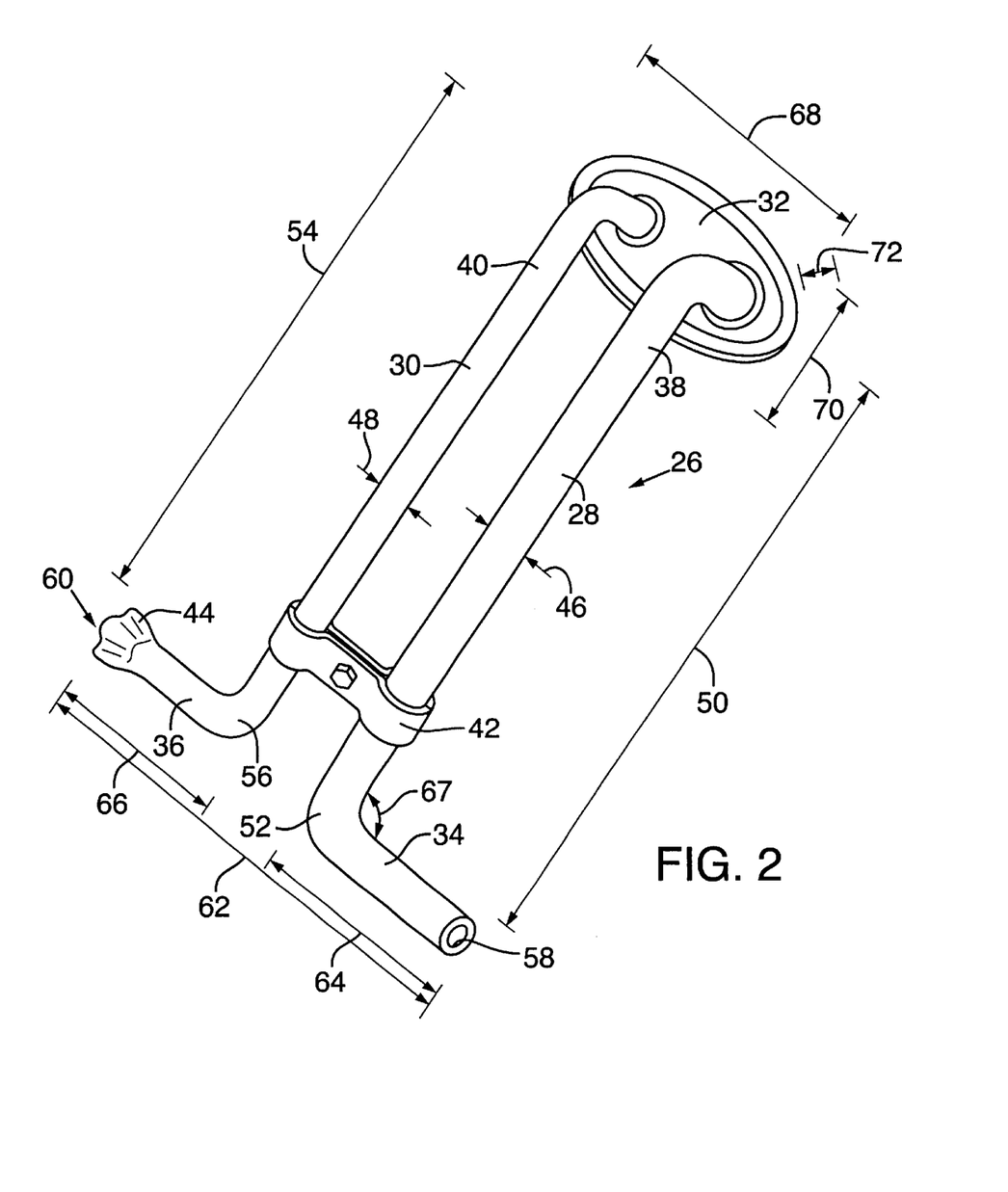
FIG. 2 is an isometric view of the draw and return tube assembly of the present invention.

FIG. 2 shows the draw and return tube assembly 26 of the present invention including a draw tube 28, a return tube 30, and a flange 32 to which the tubes are welded. Each of the tubes has a first end 34 and 36, respectively, positioned opposite the flange and a second end 38 and 40, respectively, welded to the flange. Ends 34 and 36 may be stabilized with a bracket 42 positioned therebetween. Ends 38 and 40 are seen to have a diameter the same as the diameter of the remainder of the tube. In a preferred embodiment, end 36 of return tube 30 has a crimped region 44 to constrict the tube opening. In other embodiments, region 44 may be swedged to constrict the tube opening. This swedging or crimping of the end of the return tube will facilitate the correct pressure within the tube for return of the fuel through the tube. Accordingly, the draw and return tube assembly acts as a passive flow regulator for ensuring equal levels of fuel drawn and returned to each of two saddle fuel tanks.

Draw tube 28, in the embodiment shown, has an outer diameter 46 of approximately 15/16 in (2.3 cm) and return tube 30 has an outer diameter 48 of approximately 3/4 in (1.9 cm). These diameters of the draw and return tubes are chosen so as to allow tapping and then connection of the tubes to the draw and return lines from the truck's engine, as will be described below. In other words, the tubes can be extruded in any desired diameter. Draw tube 28 typically has a length 50 of approximately 16 in (40 cm) from flange 32 to a bend region 52 of the draw tube. Return tube 30 typically has a length 54 also approximately 16 in (40 cm) from flange 32 to a bend region 56 of the return tube. The length of the tubes from the flange to the bend regions typically is identical for each of the draw and return tubes so that the pressure head of fuel at the tubes renders the draw and return tube assembly self regulating. Bend regions 52 and 56 are placed along the length of the tubes so that openings 58 and 60, respectively, of the tubes will be positioned a distance apart 62 of approximately 12 in (30 cm) so that warm fuel returned to a fuel tank will be cooled and de-aerated by the remaining fuel held within the tank prior to being redrawn into draw tube 28. Draw tube 28 has a length 64 of approximately 5 in (12.5 cm) from opening 58 to bend region 52. Similarly, return tube 30 has a length 66 of approximately 5 in (12.5 cm) from opening 60 to bend region 56. Accordingly, the tubes are spaced apart approximately 2 in (5 cm) along their lengths. Bend regions 52 and 56 typically each define an angle 67 of approximately ninety degrees within the bend regions.

Flange 32 typically has a length 68 of approximately 5 in (12.5 cm), a height 70 of approximately 2.5 in (6.3 cm), and a depth 72 of approximately 0.5 in (1.3 cm). Those skilled in the art will understand, of course, that the flange and tubes of the present invention may be manufactured in any size as required for a particular use, which is possible due to the inventive process of manufacturing the draw and tube assembly, as will be described below.

Figure 3:
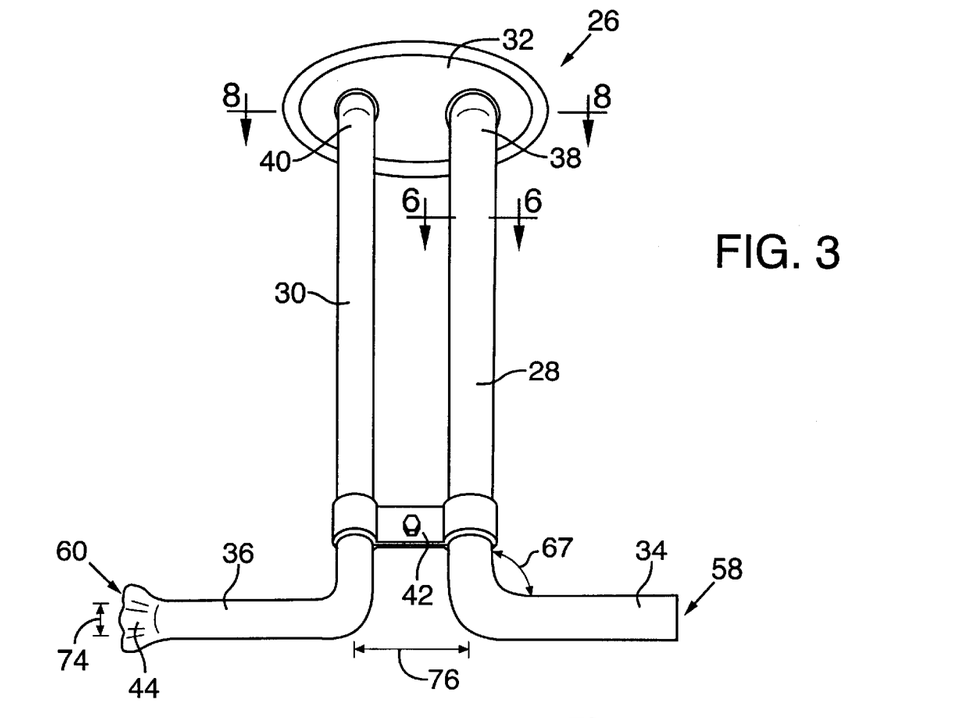
FIG. 3 is a front view of the draw and return tube assembly of FIG. 2.

FIG. 3 shows a front view of assembly 26 more clearly showing crimped region 44 of return tube 30, and bracket 42 connecting the tubes. Crimped region 44 typically has an outer diameter 74 of approximately 0.5 in (1.3 cm) of the crimped opening. End regions 34 and 36 of the tubes are positioned a distance apart 76 of approximately 3.0 in (7.5 cm) from each other, measured from center to center of the tubes.

Figure 4:
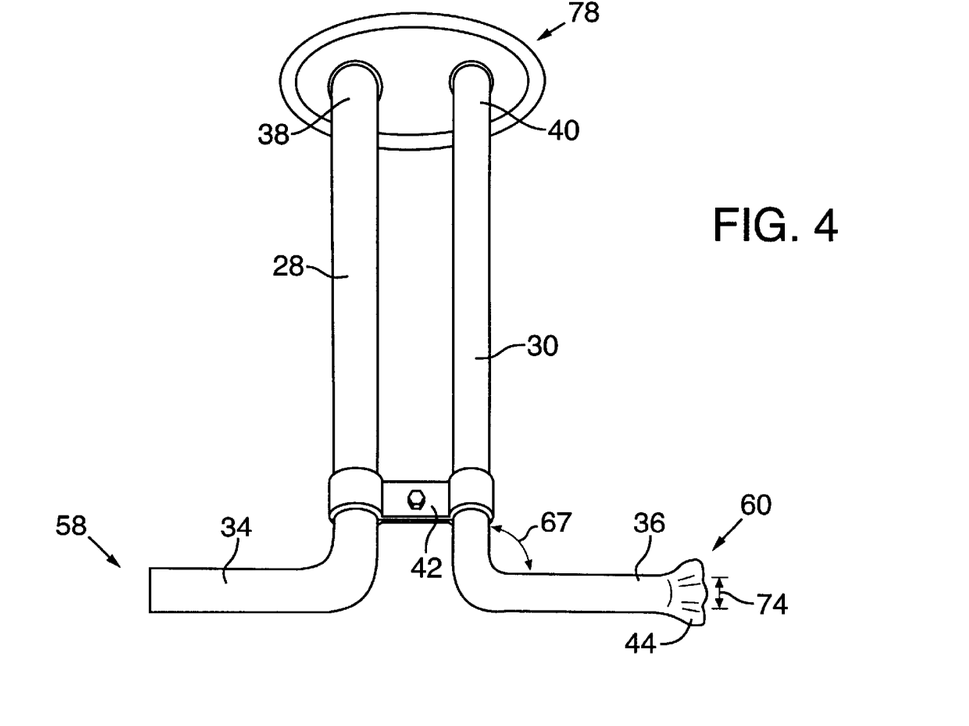
FIG. 4 is a front view of the draw and return tube assembly of the present invention having a mirror image configuration of the assembly of FIG. 3.

FIG. 4 shows a front view of another draw and return tube assembly 78 having a mirror image configuration to assembly 26 shown in FIG. 3. Accordingly, the position of the draw and return tubes is switched in this embodiment when compared to the assembly shown in FIG. 3. In use, assembly 26 of FIG. 3 may be placed in a fuel tank on the left side of a truck whereas assembly 78 of FIG. 4 may be placed in a fuel tank on the right side of a truck. If the assemblies are each positioned on the fuel tank walls toward the center of the truck, the draw tube of each assembly will be directed rearwardly in each tank. During forward acceleration of the truck fuel may be forced rearwardly within the tanks such that the surface level of fuel held within the tank is not parallel to the ground. With these mirror image assemblies positioned in each of the right and left side saddle tanks, the pressure head above each of the draw tubes will be the same. Similarly, the pressure head above each of the return tubes will also be the same. This facilitates correct operation of the assemblies in the mirror image saddle tanks.

Figures 5, 6:
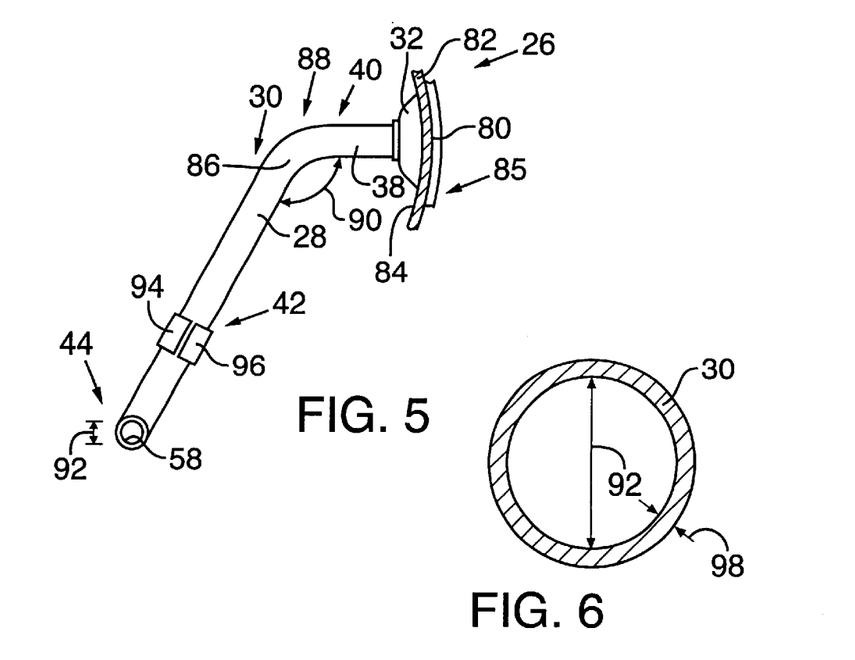
FIG. 5 is a side view the draw and return tube assembly of FIG. 2.
FIG. 6 is a cross-section view taken along line 6—6 of FIG. 3 showing a cross-section of the tube.

FIG. 5 shows a side view of draw and return tube assembly 26 mounted to an outside surface 80 of a fuel tank 82. The outer perimeter of flange 32 typically is welded to outside surface 80 and the remainder of the flange extends inwardly into an interior of the fuel tank through an aperture 85 in the side of the fuel tank. Accordingly, the perimeter of aperture 85 is slightly smaller than the perimeter of the flange. In other embodiments the flange may be welded to an inside surface 84 of the tank or attached by any other suitable means as known in the art. Tubes 28 and 30 (hidden from view) both have a bend region 86 and 88 (hidden from view), respectively, adjacent second ends 38 and 40 (hidden from view), respectively, with an angle 90 of approximately one hundred and twenty degrees. Those skilled in the art will understand that any angle, including one hundred and eighty degrees, may be used. Opening 58 of draw tube 28 has an inner diameter 92 of approximately ¾ in (1.9 cm). Opening 60 (hidden from view) of return tube 30 has an inner diameter of approximately ¼ in (0.6 cm). Bracket 42 typically comprises two mirror image pieces 94 and 96 which enclose the tubes therebetween.

FIG. 6 shows a cross-section view taken along line 6—6 of FIG. 3 wherein inner diameter 92 of return tube 30 is approximately ¾ in (1.9 cm). The tube has a thickness 98 of approximately 3/16 in (0.5 cm). Because the tube is not flared at flange 32, this inner diameter extends generally along the length of the tube and through second end 38. Similarly, return tube 30 has an inner diameter of approximately ¼ in (0.6 cm) that extends generally along the length of the tube and through second end 40. The inner and outer diameter of the return tube only varies from the remainder of the tube in crimped end 44. In the preferred embodiment, tubes 28 and 30, and flange 32 are manufactured of aluminum. Any suitable material may be used, however, including other metals and suitable man made materials such as plastics.

Figure 7:
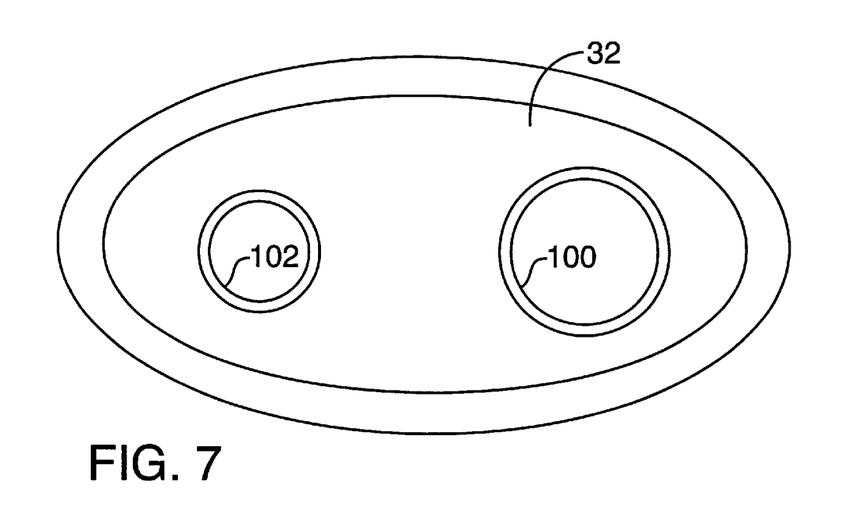
FIG. 7 is a front view of a flange shown without the draw and return tubes connected thereto.

FIG. 7 shows a front view of flange 32 without the draw and return tubes connected thereto. The flange has two apertures 100 and 102 which are sized to receive therein second ends 38 and 40, respectively, of draw and return tubes 28 and 30. Flange 32 may be manufactured in different sizes to fit within different sized fuel tanks, and may be manufactured with different sizes of apertures 100 and 102, depending on the size of the corresponding draw and return fuel line connectors for the particular truck on which the flange is mounted.

Figure 8:
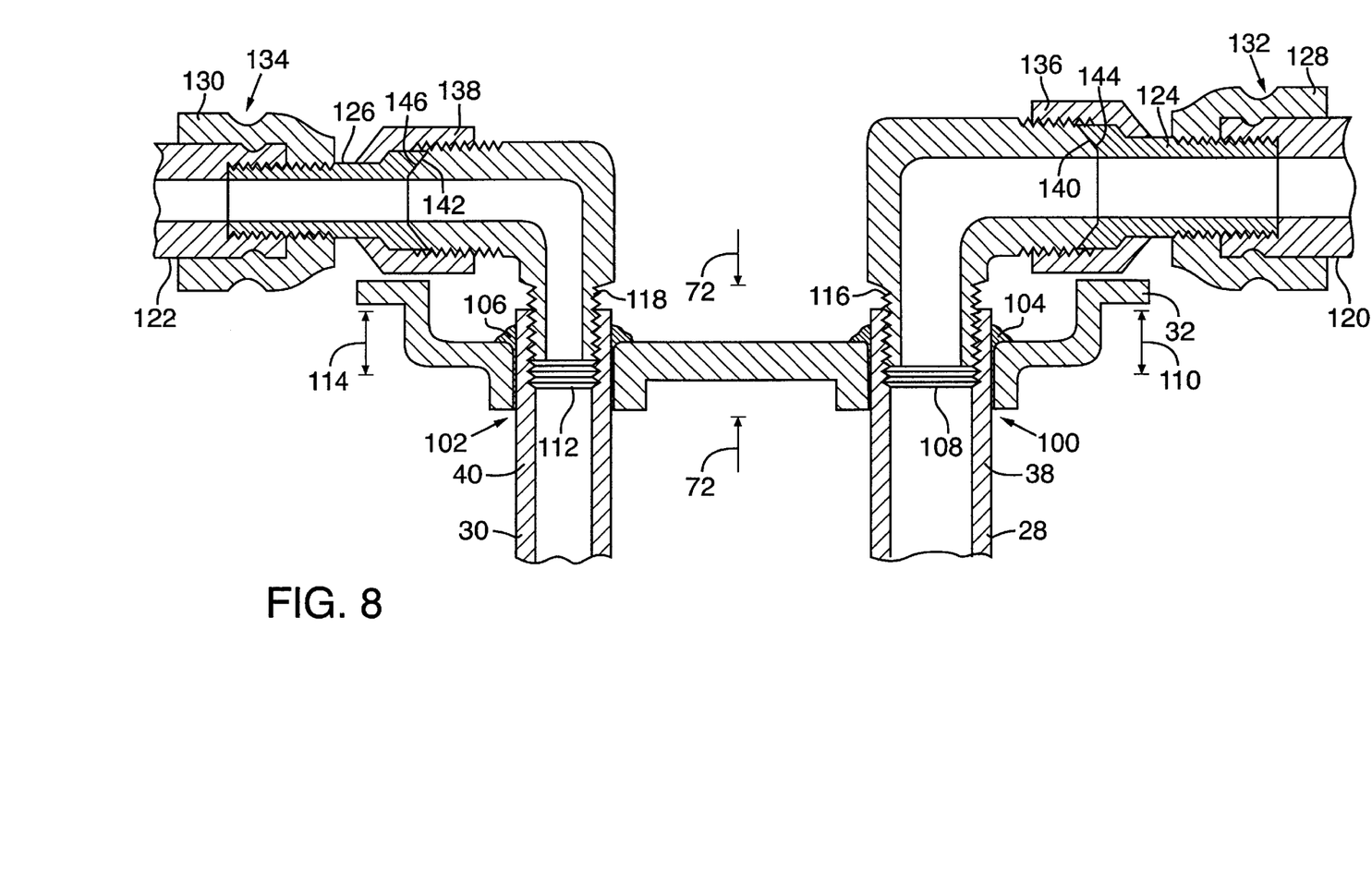
FIG. 8 is a cross-section view taken along line 8—8 of FIG. 3 showing a cross-section of the tube-to-flange connection.

FIG. 8 shows a cross-section view taken along line 8—8 of FIG. 3 showing the tube-to-flange connection and the tube-to-connector connection. Second end 38 of draw tube 28 is shown positioned within aperture 100 of flange 32 and welded thereto by a weld 104. Similarly, second end 40 of return tube 30 is shown positioned within aperture 102 of flange 32 and welded thereto by a weld 106. Welds 104 and 106 extend around each of the tubes, respectively, on a side of the flange opposite the draw and return tubes, and create an air tight seal between the flange and the tubes such that a fuel tank can be completely sealed. Draw tube 28 includes threads 108 positioned internally therein and extending downwardly a distance 110 of approximately ¾ in (1.9 cm) from the end of the tube. Similarly, return tube 30 includes threads 112 positioned internally therein and extending downwardly a distance 114 of approximately ¾ in (1.9 cm) from the end of the tube. Threads 108 and 112 can be tapped into the inner surface of the tubes in any desired gauge, as determined by the mating threads on return and draw line connectors 116 and 118, respectively, attached thereto. Connectors 116 and 118 typically comprise a ninety degree elbow bend but may be of any shape as desired. Fuel draw and return lines 120 and 122, respectively, are secured to fittings 124 and 126 by jackets 128 and 130 which are crimped at regions 132 and 134, respectively. Fittings 124 and 126 are secured to connectors 116 and 118, respectively, by hex nuts 136 and 138 such that tapered ends 140 and 142 of the connectors form an airtight seal with tapered recesses 144 and 146 of the fittings.

The process of tapping the second ends of the draw and return tubes in this inventive process is a relatively simple task because the inner diameter of the tubes is consistent along the length of the tubes in end regions 38 and 40. This consistent inner diameter is a result of the extruding process of the tubes wherein the tubes have not been flared prior to welding to the flange. In contrast, in conventional assemblies, flared tubes may have an inconsistent inner diameter such that the tapping operation to create threads within the end of the tubes can be a time consuming and inexact process. Similarly, the process of welding the first ends of the draw and return tubes to the flange in this inventive process is a relatively simple task because the outer diameter of the tubes is consistent along the length of the tubes in end regions 38 and 40. This consistent outer diameter is a result of the extruding process of the tubes wherein the tubes have not been flared prior to welding to the flange. Accordingly, the tubes easily fit within the apertures of the flange and can easily be welded thereto.

Figure 9:
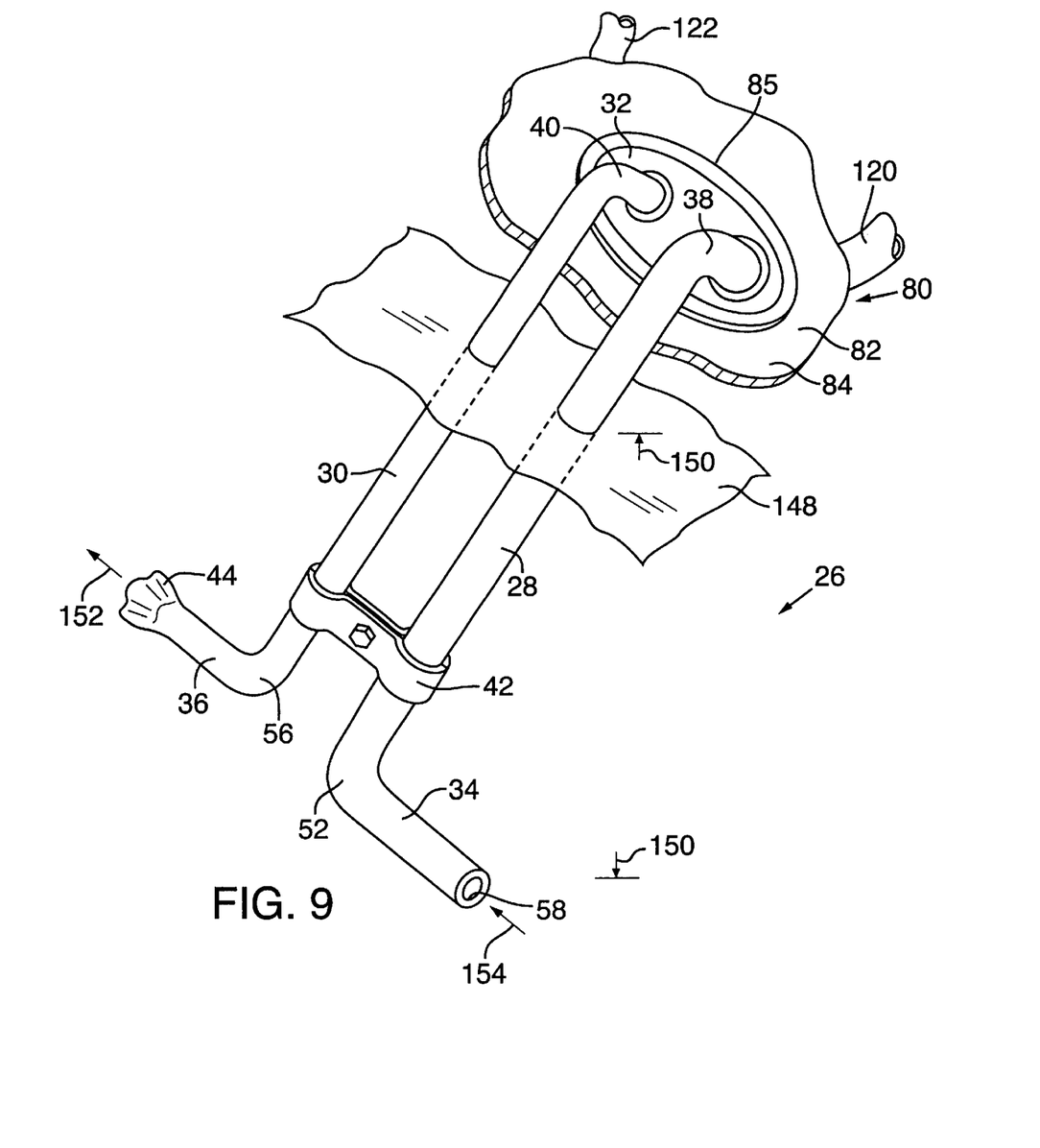
FIG. 9 is an isometric view of the draw and return tube assembly of FIG. 2 shown installed within a fuel tank and connected to draw and return fuel lines.

FIG. 9 shows draw and return tube assembly 26 welded to outer surface 80 of fuel tank 82 and connected to draw and return fuel lines 120 and 122, respectively. In other embodiments, flange 32 may be connected to the inner surface 84 of fuel tank 82 or may be connected to the fuel tank in any known manner. Tank 82 typically is a cylindrical tank manufactured of aluminum and having one of a variety of lengths and a diameter in a range of approximately 22 to 28 in (55 to 70 cm). However, any size or shape fuel tank may be used in conjunction with the draw and return tube assembly of the present invention.

Still referring to FIG. 9, fuel 148 is shown contained within tank 82, the fuel creating a pressure head 150 on each of tubes 28 and 30. This pressure head, along with the custom chosen diameters of the extruded tubes and crimped end 44 of return tube 30, ensures an even flow of fuel from each of the saddle fuel tanks to the engine and from the engine to each of the saddle fuel tanks through the return tubes. Fuel is generally returned to the tank in a direction 152 from return tube 30 and is drawn into draw tube 28 in a direction 154, wherein direction 152 is opposite direction 154 such that warm, aerated fuel from the engine is not immediately returned through the draw tube to the engine.

The process of manufacturing draw and return tube assembly 26 will now be described. Tubes 28 and 30 are first extruded with the desired inner and outer diameter. Due to the relatively low cost of extruding tubing, virtually any size of tubing can be used in conjunction with the present invention. Typically, the inner and outer diameter of the tubing chosen is dependent on the outer threaded diameter of draw and return line connectors 116 and 118 attached to draw and return lines 120 and 122 extending from the truck's engine. Once the tubing has been extruded with the desired inner and outer diameter, the tubes are cut to the correct length.

Next, the tubes are bent at their second ends, 38 and 40, to create the one hundred and twenty degree angle of the tubes which extend from flange 32. The tubes are then bent a second time to define bend regions 52 and 56. The bends typically are positioned in the tubes normal to one another. Second ends 38 and 40 of the tubes are then positioned within apertures 100 and 102, respectively, of flange 32 and welded to the flange on an underside thereof. As described above, due to the uniform outer diameter of the tubes, which have not been subjected to a flaring step, positioning the tubes within the flange and completing the welding step is a relatively easy and efficient process. Bracket 42 is then secured to the tubes adjacent bend regions 52 and 56 to stabilize the device.

Once the tubes have been welded to the flange, the inner diameter of the tubes adjacent the flange are tapped to create threads having the same gauge as the threads of draw and return line connectors 116 and 118. As described above, due to the uniform inner diameter of the tubes, which have not been subjected to a flaring step, tapping the inner surface of the tubes adjacent the flange is a relatively easy and efficient process. The first end of one or both of the tubes may then be swedged or crimped.

The entire process of bending, welding and tapping the tubes may take as little as three minutes per tube, and approximately six minutes per assembly. Accordingly, this inventive process is approximately 33% faster than prior art processes. Moreover, the inventive process does not entail annealing, flaring, or cleaning of the tubes, which are costly steps of the prior art processes. In addition, the inventive process does not produce hazardous byproduct materials which further increases the cost of manufacturing the product. Accordingly, this inventive process is approximately 33% less expensive than prior art processes.

Figure 10:
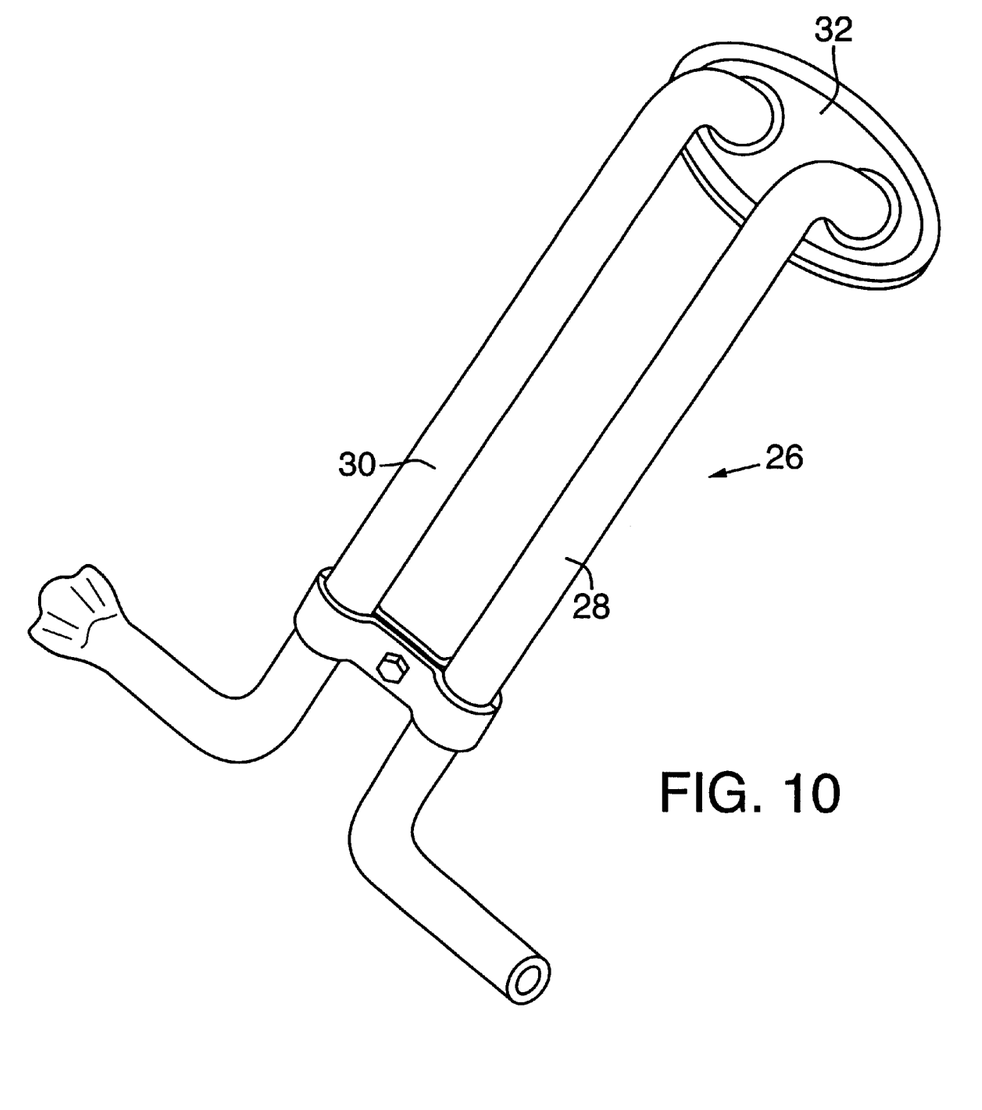
FIG. 10 is an isometric view of another embodiment of the assembly.

FIG. 10 shows another embodiment of the assembly wherein the draw and the return tubes have the same outer and inner diameter. This embodiment further illustrates the versatility of the present invention in that a variety of sizes of tubes and flanges may be utilized due to the inexpensive process of extruding the draw and return tubes.

In the above description numerous details have been set forth in order to provide a more through understanding of the present invention. It will be obvious, however, to one skilled in the art that the present invention may be practiced using other equivalent designs.

We claim:

1. A draw and return tube fuel assembly for use in commercial vehicles, comprising:

a flange having first and second apertures extending therethrough;

a return tube having a first end region secured within said first aperture of the flange, said first end region of the return tube having an outer diameter that is uniform within said first end region; and a draw tube having a first end region secured within said second aperture of the flange, said first end region of the draw tube having an outer diameter that is uniform within said first end region.

2. The draw and return tube fuel assembly of claim 1 wherein the return and draw tubes are manufactured by the process of extrusion.

3. The draw and return tube assembly of claim 1 wherein the outer diameter of the return tube is different than the outer diameter of the draw tube.

4. The draw and return tube fuel assembly of claim 1 wherein the draw and return tubes are manufactured of aluminum.

5. The draw and return tube fuel assembly of claim 1 wherein the return tube has an inner diameter that is uniform within said first end region of the return tube.

6. The draw and return tube fuel assembly of claim 1 wherein the draw tube has an inner diameter that is uniform within said first end region of the draw tube.

7. The draw and return tube fuel assembly of claim 1 wherein said outer diameter of the return tube is uniform along an entire length of the return tube, excluding a crimped second end region of the return tube.

8. The draw and return tube fuel assembly of claim 1 wherein said outer diameter of the draw tube is uniform along an entire length of the draw tube.

9. A passive flow regulator for use in a fuel tank of a commercial vehicle, comprising:

a flange having first and second connection ports and being adapted for placement against a wall of a commercial fuel tank;

a return tube having a first end region secured within said first connection port of the flange, said first end region of the return tube having an outer diameter that is uniform within said first end region of the return tube; and a draw tube having a first end region secured within said second connection port of the flange, said first end region of the draw tube having an outer diameter that is uniform within said first end region of the draw tube.

10. The passive flow regulator of claim 9 wherein the return and draw tubes are manufactured by the process of extrusion.

11. The passive flow regulator of claim 9 wherein the outer diameter of the return tube is different than the outer diameter of the draw tube.

12. The passive flow regulator of claim 9 wherein the draw and return tubes are manufactured of aluminum.

13. The passive flow regulator of claim 9 wherein the return tube includes an inner diameter that is uniform within said first end region of the return tube and wherein the draw tube includes an inner diameter that is uniform within said first end region of the draw tube.

* * * * *